USO10527084B2

(12) United States Patent
Prevost (10) Patent No.: US 10,527,084 B2
(45) Date of Patent: Jan. 7, 2020

(54) ELASTOMERIC COLLAR FOR FASTENERS

(71) Applicant: Christopher Prevost, Sonoma, CA (US)

(72) Inventor: Christopher Prevost, Sonoma, CA (US)

( * ) Notice: Subject to any disclaimer, the term of this patent is extended or adjusted under 35 U.S.C. 154(b) by 236 days.

(21) Appl. No.: 15/598,380

(22) Filed: May 18, 2017

(65) Prior Publication Data
US 2017/0335880 A1    Nov. 23, 2017

Related U.S. Application Data

(60) Provisional application No. 62/338,820, filed on May 19, 2016.

(51) Int. Cl.
| F16B 43/00 | (2006.01) |
| F16B 5/02 | (2006.01) |
| F16B 5/04 | (2006.01) |
| F16B 21/02 | (2006.01) |

(52) U.S. Cl.
CPC .......... *F16B 43/001* (2013.01); *F16B 5/0241* (2013.01); *F16B 5/04* (2013.01); *F16B 21/02* (2013.01); *F16B 43/00* (2013.01)

(58) Field of Classification Search
CPC ........ F16B 5/0241; F16B 5/0258; F16B 5/04; F16B 21/02; F16B 21/18; F16B 33/004; F16B 39/10; F16B 39/24; F16B 43/00; F16B 43/001; F16B 43/004; B60R 16/0222; F16L 5/10
USPC .......... 411/368–370, 371.1–371.2, 517, 531, 411/542, 546; 16/2.2
See application file for complete search history.

(56) References Cited

U.S. PATENT DOCUMENTS

| 321,255 | A | * | 6/1885 | Smith | .............. | B60B 3/14 |
| | | | | | | 301/114 |
| 1,955,740 | A | | 4/1934 | Dzus | | |
| 2,560,092 | A | * | 7/1951 | De La Mater | ......... | B65D 90/08 |
| | | | | | | 16/2.2 |
| 2,882,073 | A | * | 4/1959 | James | .............. | F16L 13/113 |
| | | | | | | 277/615 |
| 2,893,722 | A | | 7/1959 | Beck | | |
| 3,350,042 | A | | 10/1967 | Stewart et al. | | |
| 3,500,712 | A | * | 3/1970 | Wagner | .............. | F16B 43/001 |
| | | | | | | 411/369 |

(Continued)

OTHER PUBLICATIONS cable organizer.com, "Rubber Grommet", http://www.cableorganizer.com/grommett/, Apr. 22, 2016, one page.

(Continued)

*Primary Examiner* — Roberta S Delisle
(74) *Attorney, Agent, or Firm* — Finch & Maloney PLLC (57) ABSTRACT

An elastomeric collar has a body portion with a generally cylindrical shape from a first end portion to a second end portion and defining a through opening extending along a central axis. A first annular flange is connected to and extends radially outward from the first end portion of the body portion. A second annular flange is connected to and extends radially outward from the second end portion of the body portion, where the second annular flange is axially spaced by a gap from the first annular flange. The body portion, the first annular flange, and the second annular flange are made of an elastomer having a durometer of at least 40A.

20 Claims, 6 Drawing Sheets

(56) References Cited

U.S. PATENT DOCUMENTS

| | | | |
|---|---|---|---|
| 3,661,046 A * | 5/1972 | Waud | F16B 25/0021 |
| | | | 277/637 |
| 3,756,551 A | 9/1973 | Bishop | |
| 4,066,058 A | 1/1978 | Anderkay | |
| 4,072,245 A * | 2/1978 | Sloan, Jr. | B60K 15/0406 |
| | | | 16/2.2 |
| 4,522,378 A | 6/1985 | Nelson | |
| 4,534,545 A | 8/1985 | Fannin et al. | |
| 5,052,699 A * | 10/1991 | Tucker | H02G 3/0675 |
| | | | 16/2.2 |
| 5,165,687 A | 11/1992 | Soong | |
| 5,238,233 A | 8/1993 | Hein | |
| 5,304,037 A | 4/1994 | Scofield | |
| 5,310,276 A | 5/1994 | Bergers et al. | |
| 5,765,819 A | 6/1998 | Hummel | |
| 5,791,637 A | 8/1998 | Reichelt et al. | |
| 6,088,874 A * | 7/2000 | Nakata | F16L 5/10 |
| | | | 16/2.1 |
| 6,088,876 A * | 7/2000 | Daoud | F16L 5/10 |
| | | | 16/2.2 |
| 6,115,259 A | 9/2000 | Karner | |
| 6,227,784 B1 | 5/2001 | Antoine et al. | |
| 6,290,238 B1 * | 9/2001 | Johnson, Jr. | F16L 37/256 |
| | | | 277/613 |
| 6,354,558 B1 | 3/2002 | Li | |
| 7,284,748 B2 | 10/2007 | Mishima | |
| 7,712,730 B2 | 5/2010 | Fabrizio | |
| 7,740,433 B2 * | 6/2010 | Miyoshi | F16B 43/001 |
| | | | 411/371.1 |
| 8,152,146 B2 | 4/2012 | Rodecker | |
| 8,622,376 B2 | 7/2014 | Lavigne | |

OTHER PUBLICATIONS

Lawson Products, "Bonded Sealing Washer 18-8 Stainless Steel", Apr. 4, 2016, one page.

cable organizer.com, Rubber Grommet (Apr. 22, 2016).

Lawson Products, Bonded Sealing Washer 18-8 Stainless Steel (Apr. 4, 2016).

RaceReady Products, DZUS Fasteners image, available at http://www.racereadyproducts.com/body-panel-fastners/dzus-fastners/, (admitted prior art).

Columbia Air Motive, DZUS Standard Line Fasteners, available at http://www.columbiaairmotive.com/StartQuery.php? Id=DZUS_Fasteners&display_cat=True, (Apr. 22, 2016).

Aviation Maintenance Technician Handbook, DZUS Fasteners, Fig. 5-58, available at http://avstop.com/ac/Aviation_Maintenance_Technician_Handbook_General/5-66.html (admitted prior art).

AvStop.com webpage, Turnlock Fasteners, available at http://avstop.com.ac/apgeneral/turnlockfasteners.html (Feb. 10, 2016).

* cited by examiner

ELASTOMERIC COLLAR FOR FASTENERS

BACKGROUND OF THE INVENTION

1. Field of the Invention

The present invention relates generally to fasteners and washers. Particularly, the present invention relates to a collar or washer for use with turnlock fasteners and other fasteners.

2. Description of the Prior Art

Turnlock fasteners are used to secure inspection plates, doors, and removable panels on aircraft, refrigeration equipment, marine vessels, electronics, automotive, and industrial equipment. Turnlock fasteners are also known as quick-opening fasteners, quick-action fasteners, and stressed-panel fasteners. Various manufacturers and trade names are associated with these fasteners, such as Dzus®, Camloc®, and Airloc®. Turnlock fasteners lock after ¼ turn and therefore permit quick and easy removal of access panels for inspection and service purposes while also preventing unintentional loosening or removal of the fastener. The Dzus® fasteners have an "over-center" design that requires positive sustained torque to unfasten. As a result, vibration and minor disturbances to the fastener tend to self-correct rather than further loosen as occurs with threaded fasteners.

The Dzus® fastener is described in U.S. Pat. No. 1,955,740 to William Dzus. Two panels can be quickly fastened together by bringing the panels together with holes aligned. The bottom or inside panel has a wire connector extending across the hole. The shank of the button is placed into the hole of the top or outside panel, and then the button is turned to a position where slots in the shaft will hold the wire connector. As the button turns, the walls of its spiral slots act as cams, and pull the intermediate section of the wire connector from its relaxed position up into the slot's holes past the slot's projections, thereby drawing the top or outer panel towards the lower or inner panel. The projection in the slots resists reverse rotation of the button and thus prevents unintentional separation of the two panels due to vibration. Optionally, to prevent noise, strips of felt may be placed between the two panels. The buttons are typically made of steel and have a flush head, oval head, or wing head.

Washers of the prior art for turn-lock fasteners have the shape of a coned-disc spring washer and are made of aluminum. These washers are known as the Belleville washer. The conical shape of the washer engages a sloped bottom face of the fastener head. This type of washer results in a tighter fit between the fastener head and the outer panel.

SUMMARY OF THE INVENTION

Although turnlock fasteners have been widely accepted for securing panels together, the fasteners have deficiencies. When used on aircraft, turnlock fasteners allow enough movement between the panel and the fastener head to result in wear to the outer panel. Vibration and movement at the fastener can result in wear to an aircraft cowling. After about 1000 hours of flight, the wear to the cowling may be severe enough to warrant replacement. With a cost of about $100,000 for some cowlings, replacement is an undesirable expense, especially when the remainder of the cowling is in serviceable condition.

Another deficiency of turnlock fasteners is that the fastener does not provide a water-tight seal with the panel when fastened. As such, water, oil, and other fluids can leak between the panels and the fastener, leading to corrosion and a tarnished appearance.

Accordingly, a need exists for a fastener collar that alleviates the deficiencies of prior-art turnlock fasteners and washers. Accordingly, it is desirable to provide a fastener collar that reduces wear to panels held together by fasteners, such as turnlock fasteners. It is also desirable to isolate a turnlock fastener from a panel through which it is attached.

An elastomeric collar in accordance with this disclosure is intended for use with turnlock fasteners and other fasteners. One embodiment of an elastomeric fastener collar has a body portion generally having a hollow cylindrical shape extending along a central axis and defining a through-opening along the central axis. The body portion has an upper body end portion, a lower body end portion, an inside body surface, and an outside body surface. A first annular flange is continuous with and extends radially outward from the upper body end portion. The first annular flange has a first flange top surface and a first flange bottom surface. A second annular flange is continuous with and extends radially outward from the lower body end portion. The second annular flange has a second flange top surface and a second flange bottom surface, where the second annular flange is axially spaced by a gap from the first annular flange. The body portion, the first annular flange, and the second annular flange comprise a single monolithic structure made of an elastomer having a durometer of at least 40A.

In another embodiment, the elastomer has a durometer of at least 60A or at least 95A. In some embodiments, the elastomer is polyurethane, butadiene, natural rubber, or nylon.

In another embodiment, the body portion has an annular protrusion extending radially inward from the inside body surface. In some embodiments, the annular protrusion has a rounded profile. In some embodiments, the annular protrusion extends from the inside body surface of the upper end portion. In other embodiments, the annular protrusion extends from the inside body surface of the lower end portion.

In another embodiment, the first flange bottom surface and the second flange top surface each extend from the body portion in parallel at an angle of 55-60° with respect to the central axis. For example, when the central axis is vertically oriented, the first flange bottom surface and the second flange top surface each extends upward to define an angle of 55-60° with the central axis.

In some embodiments, at least two of the first flange top surface, the first flange bottom surface, the second flange top surface, and the second flange bottom surface are inclined with respect to the central axis, such as defining an angle of 30-45°, 45-55°, 55-60°, or 60-70° with the central axis.

In some embodiments, the first annular flange is at least partially nested within the second annular flange. In some embodiments, for example, the top-most surface of the first flange is substantially coplanar with the top-most surface of the second flange.

In some embodiments, the gap between the first and second flanges is from about 0.2 to about 0.6 inch.

In some embodiments, at least one of the first flange top surface and the second flange bottom surface is perpendicular to the central axis.

In some embodiments, the first flange top surface and/or the second flange bottom surface is substantially parallel to the second flange top surface. For example, these surfaces all define an angle that is within about 3 degrees of each other.

In some embodiments, the second flange bottom surface is parallel to the second flange top surface. In other embodiments, at least two of the first flange top surface, the first flange bottom surface, the second flange top surface, and the second flange bottom surface extend from the body portion in parallel.

In another aspect of the present invention, a fastener collar has a body portion generally having a hollow cylindrical shape extending along a central axis and defining a through-opening along the central axis. The body portion has an upper body end portion with an upper body end, a lower body end portion with a lower body end, an inside body surface, and an outside body surface. An annular protrusion with a rounded profile extends radially inward from the inside body surface of the upper body end portion. A first annular flange is continuous with and extends radially outward from the upper body end portion, where the first annular flange has a first flange top surface and a first flange bottom surface. A second annular flange is continuous with and extends radially outward from the lower body end portion, where the second annular flange has a second flange top surface and a second flange bottom surface, and where the second annular flange is axially spaced by a gap from the first annular flange. The body portion, the first annular flange, the second annular flange comprise a single monolithic structure made of an elastomer having a durometer of at least 60. At least one of the first flange top surface, the first flange bottom surface, the second flange top surface, and the second flange bottom surface is inclined with respect to the central axis.

In other embodiments, at least two of the first flange top surface, the first flange bottom surface, the second flange top surface, and the second flange bottom surface are inclined at an angle of 55-60° with respect to the central axis. Other angles of inclination are also acceptable as noted above. In some embodiments, for example, at least two of the first flange top surface, the first flange bottom surface, the second flange top surface, and the second flange bottom surface extend from the body portion in parallel.

In some embodiments, at least one of the first flange top surface and second flange bottom surface is perpendicular to the central axis.

In other embodiments, the first flange bottom surface is substantially parallel to the second flange top surface. In other embodiments, the body portion, first flange, and/or second flange have a shape other than circular, such as oblong, rectangular.

DETAILED DESCRIPTION OF THE PREFERRED EMBODIMENT

The preferred embodiment of the present invention is illustrated in FIGS. 1-6. FIGS. 1A, 1B, and 1C illustrate one embodiment of a fastener collar 100 shown in perspective view, side elevational view, and sectional elevation as taken along section line A-A of FIG. 1B, respectively. Collar 100 is made of an elastomer, such as polyurethane, butadiene, or natural rubber. In one embodiment, collar 100 is single, monolithic structure made of polyurethane with a durometer of about 95A. Other acceptable materials include natural rubber with a durometer of about 60 and butadiene with a durometer of about 40.

Figure 1A:
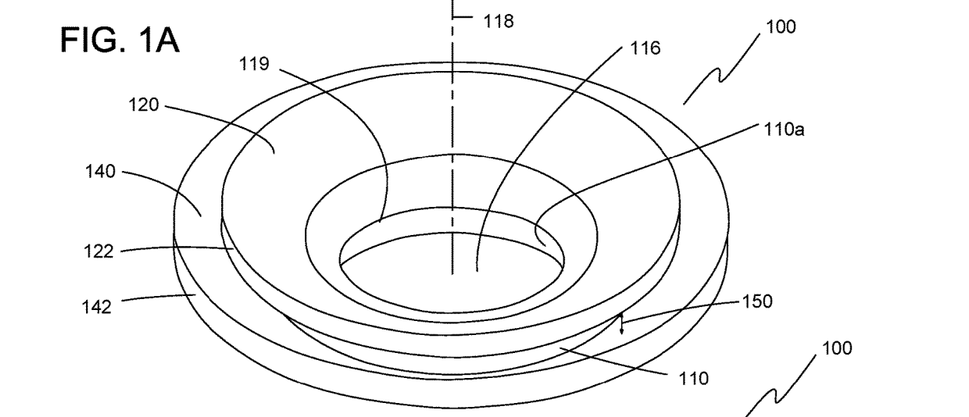
FIGS. 1A-1C illustrate perspective, elevational, and sectional views, respectively, of one embodiment of an elastomeric collar of the present invention configured for a recessed-head fastener.
Figure 1B:
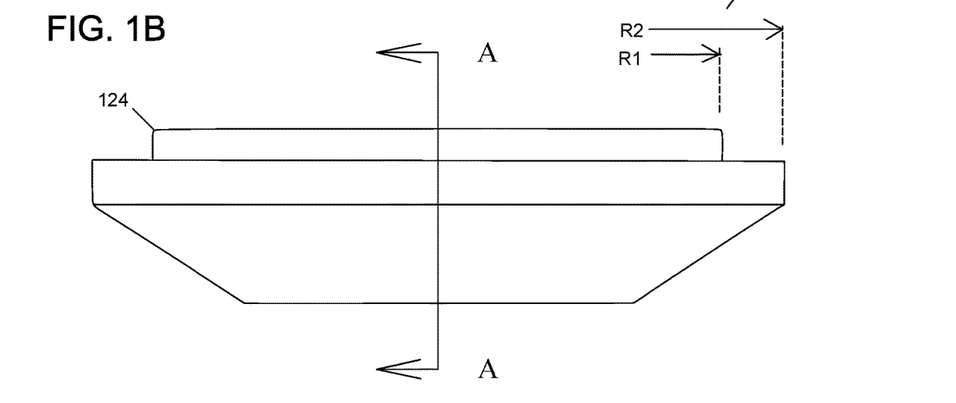
Figure 1C:
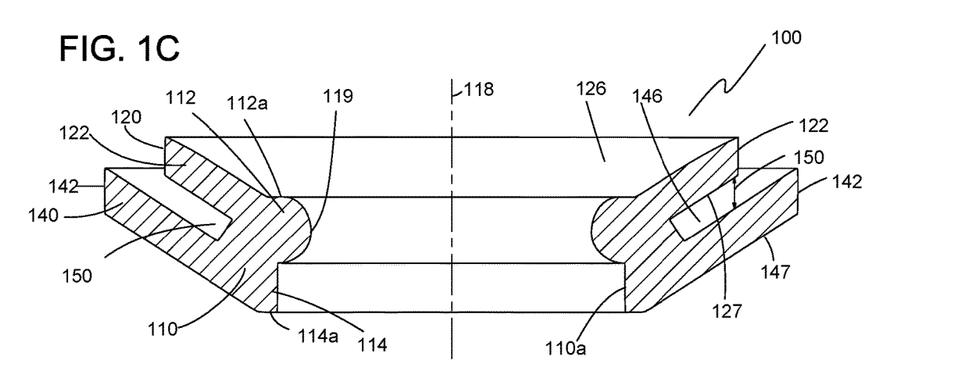
Figure 2A:
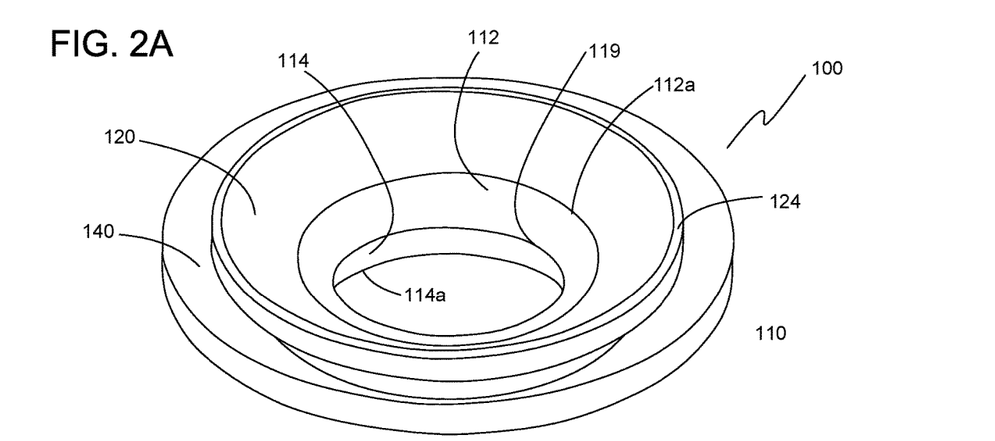
FIGS. 2A-2C illustrate perspective, elevational, and sectional views, respectively, of another embodiment of an elastomeric collar of the present invention showing a rounded rim on the upper flange and configured for a recessed-head fastener.
Figure 2B:
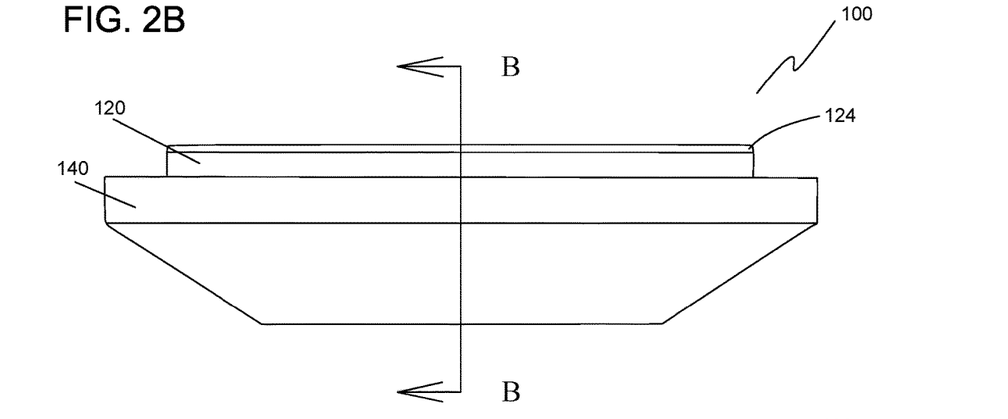
Figure 2C:
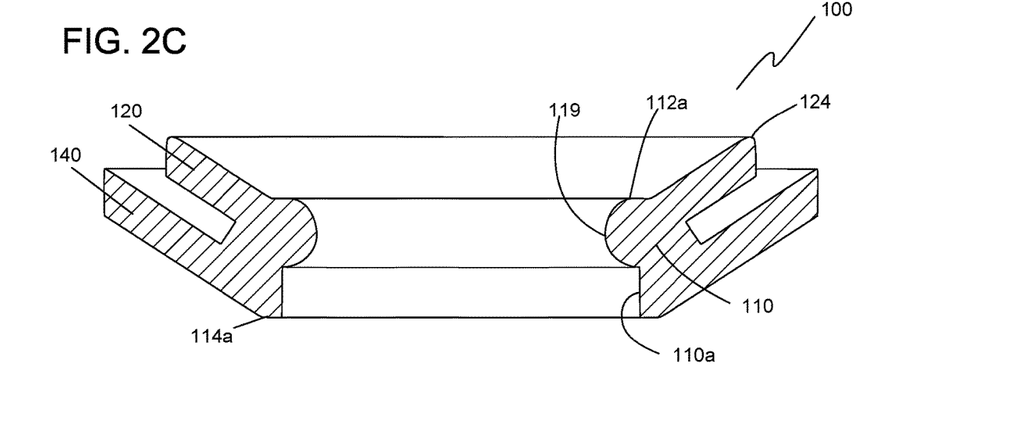

Collar 100 includes a hollow shaft portion or body portion 110 having a generally cylindrical shape and extending along a central axis 118 from a first body end portion with a first body end 112a to a second body end portion 114 with a second body end 114a. Body portion 110 defines a central opening 116 through body portion 110 along central axis 118. In one embodiment, central opening 116 has a minimum diameter of 0.315 inch that is sized for a corresponding turnlock fastener 200. In other embodiments, central opening 116 has a minimum diameter of 0.0335 inch or 0.410 inch. Other sizes are acceptable.

A first flange 120 is joined to or continuous with body portion 110 adjacent first body end portion 112 and extends radially outward to a first outer flange end 122. First flange 120 has a first flange top surface 126 and a first flange bottom surface 127 that extend in parallel to first outer flange end 122. A second flange 140 is joined to or continuous with body portion 110 adjacent second body end portion 114 and extends radially outward to a second outer flange end 142. Second flange 140 has a second flange top surface 146 and a second flange bottom surface 147 that extend in parallel to second outer flange end 142. First flange 120 and second flange 140 each generally have the shape of a frustoconical annulus and extend radially outward in a parallel, spaced-apart relationship from body portion 110. In one embodiment, at least two of the first flange top surface 126, first flange bottom surface 127, second flange top surface 146, and second flange bottom surface 147 are inclined with respect to the central axis 118. For example, the first flange bottom surface 127 and the second flange top surface 146 extend substantially in parallel at an angle α with respect to the central axis 118, where the angle α is 55-60°. Other values of angle α are acceptable.

First flange 120 and second flange 140 are separated axially by a gap 150. In one embodiment, gap 150 is substantially constant with increasing radius. In other embodiments, gap 150 increases or decreases with increasing radius from body portion 110. In some embodiments, the gap 150 is sized to correspond to the thickness of the sheet where the collar 100 is installed. In one embodiment, for example, gap 150 is about 0.032 inch, which is a common thickness of aluminum sheet used for aircraft and motorsports. In other embodiments, gap 150 is from 0.025 to 0.063 inch. In yet other embodiments, gap 150 is 0.017 to 0.035 in as consistent with common thicknesses of stainless steel sheet.

In one embodiment, first flange 120 is at last partially nested in second flange 140, where first outer flange end 122 has a first outer radius R1 and second outer flange end 142 has a second outer radius R2 that is greater than R1. In one embodiment, R1 is about 0.032 inch and R2 is about 0.0387 inch. In other embodiments, R1 is equal to or greater than R2.

In one embodiment, such as shown in FIGS. 1A-1C and 2A-2C, first flange 120 and second flange 140 extend at an angle α of about 30-35 degrees to the horizontal (i.e., 55-60 degrees with respect to central axis 118.) In one embodiment, angle α is 33° to the horizontal (i.e., 57° to central axis 118) as consistent with the geometry of some turnlock fasteners with a flat head that is recessed into a panel opening 262 (shown in FIG. 6).

First outer flange end 122 and second outer flange end 142 may be straight or curved. In some embodiments as shown in FIGS. 1A-1C, first outer flange end 122 and second outer flange end 142 are straight and extend parallel or substantially parallel to central axis 118. In some embodiments, first flange 120 has a thickness that is less than a thickness of second flange 140. For example, first outer flange end 122 has a vertical height of about 0.040 inch or thickness of about 0.033 inch as measured perpendicular to first flange top surface 126; second outer flange end 142 has a vertical height of about 0.050 inch or thickness of about 0.042 inch as measured perpendicular to second flange top surface 146. In one embodiment, a first upper rim 124 of first flange 120 is rounded with a radius of curvature of 0.008 inch as shown, for example, in FIGS. 2A-2C.

Body portion 110 defines a rounded annular protrusion 119 (also known as a retaining lip) extending into central opening 116 from inside surface 110a. In one embodiment, annular protrusion starts at or near first body end 112 and curves down with a radius of 0.0375 inch. Accordingly, in one embodiment central opening 116 has a minimum diameter of about 0.315 inch at annular protrusion 119 and about 0.390 inch at inside surface 110a located above or below annular protrusion 119. In some embodiments as shown in FIGS. 1A-1C and 2A-2C, annular protrusion 119 extends axially about 0.075 inch of a total axial distance of 0.131 inch for body portion 110. In other words, annular protrusion 119 extends axially about 57% of the axial height of body portion 110 along inside surface 110a.

Figure 6:
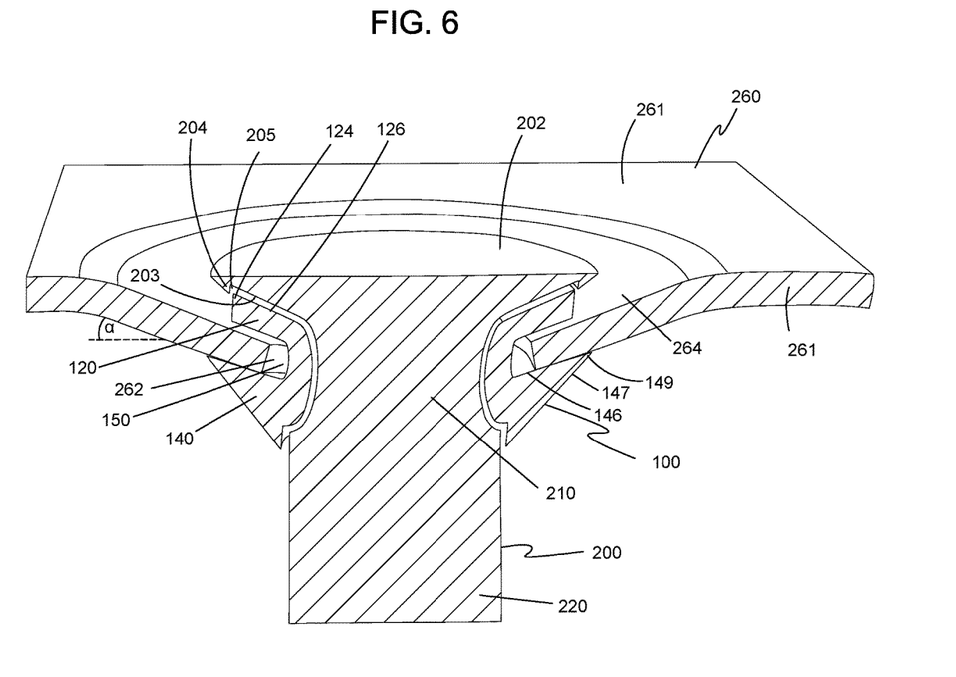
FIG. 6 illustrates a sectional view of one embodiment of a recessed fastener installed through an opening of an outer panel, where an elastomeric collar of the present invention is installed in the opening of the panel.

Annular protrusion 119 is sized and positioned to mate with a narrowed neck 210 on a fastener, such as shown, for example, in FIG. 6. Annular protrusion 119 may be modified, diminished, or omitted, depending on the geometry and type of the particular fastener used. For example, annular protrusion 119 may be omitted when collar 100 is used with a standard screw or bolt, particularly when the standard fastener is seldom or never removed after installation.

Figure 3A:
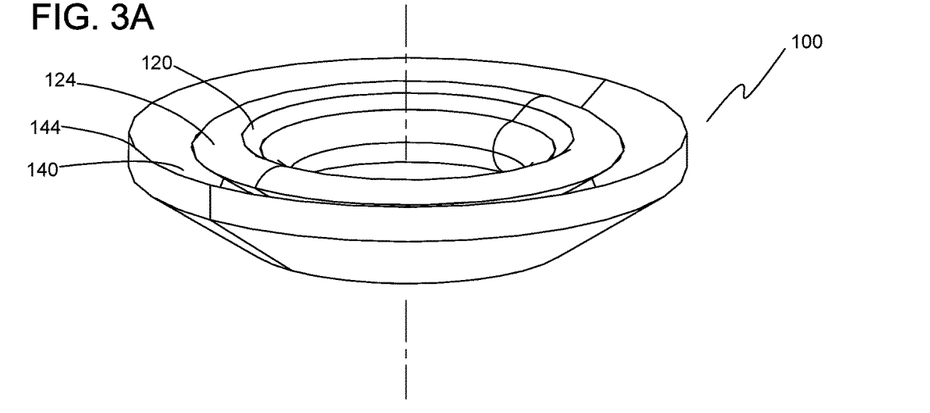
FIGS. 3A-3C illustrate perspective, elevational, and sectional views, respectively, of another embodiment of an elastomeric collar of the present invention showing a further rounded rim on the upper flange and configured for a flat-head or recessed-head fastener.
Figure 3B:
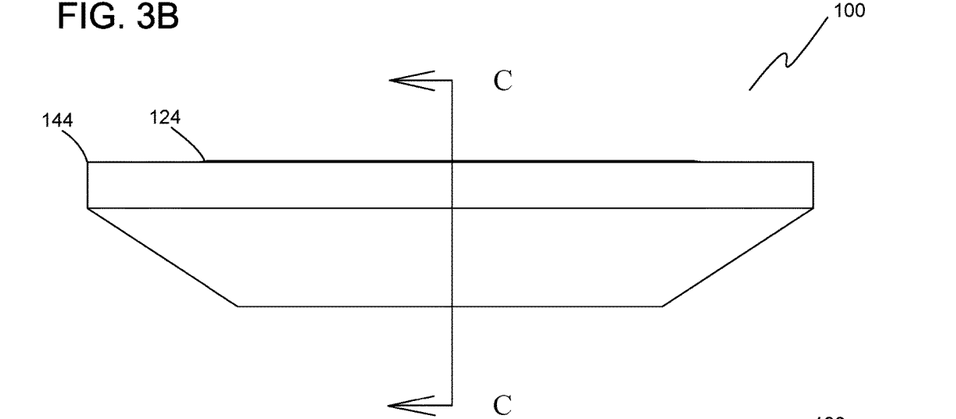
Figure 3C:
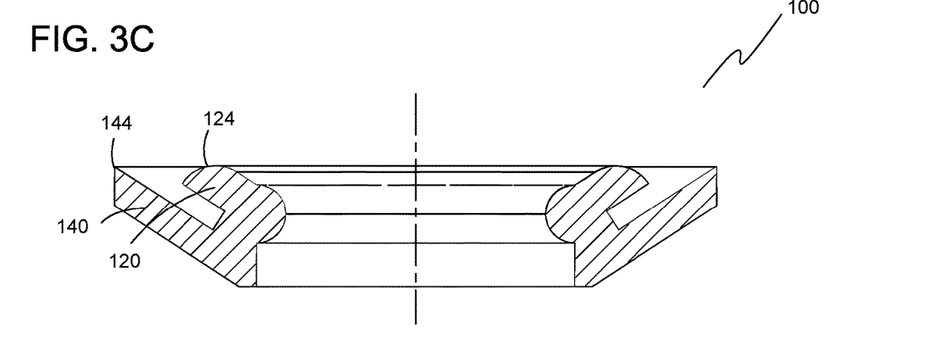

Referring now to FIGS. 3A-3C, another embodiment of collar 100 is shown in a perspective view, a front elevational view, and a sectional view as taken along line C-C of FIG. 3B, respectively. Collar 100 of FIGS. 3A-3C has a rounded first upper rim 124, but with a radius of curvature that first upper rim 124 becomes a domed upper surface. As such, collar 100 is configured for use with flat-head fasteners. For example, first upper rim 124 has a radius of curvature of about 0.050 inch, which is also the approximate thickness of first flange 120. When rounded as such, first upper rim 124 of first flange 120 is substantially flush with second upper rim 144 as illustrated in FIGS. 3B-3C. Such geometry of collar 100 more closely mates with the bottom face of the head 202 of some turnlock fasteners that include a downward protrusion 204 along the edge of the fastener head 202. Collar 100 of FIGS. 1A-1C, 2A-2C, and 3A-3C are particularly suited for turnlock fasteners with a flat, recessed head.

Figure 4A:
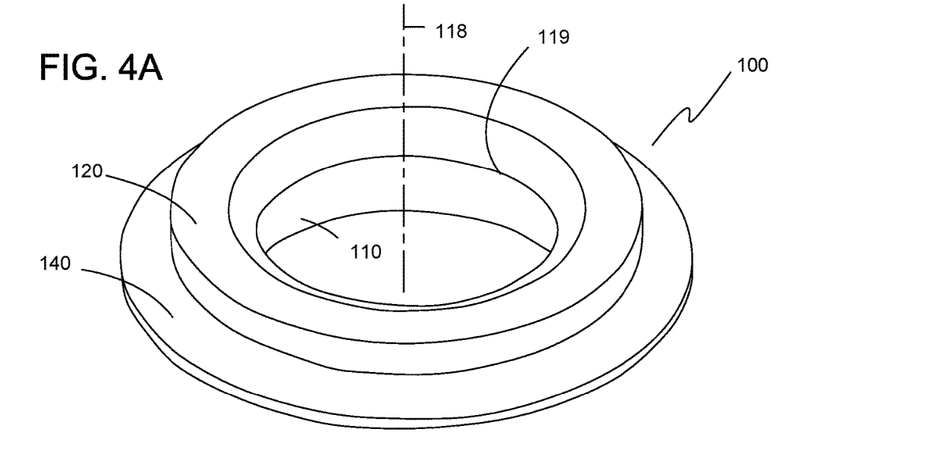
FIGS. 4A-4C illustrate perspective, elevational, and sectional views, respectively, of another embodiment of an elastomeric collar of the present invention configured for a domed-top or button-cap fastener in a non-recessed opening.
Figure 4B:
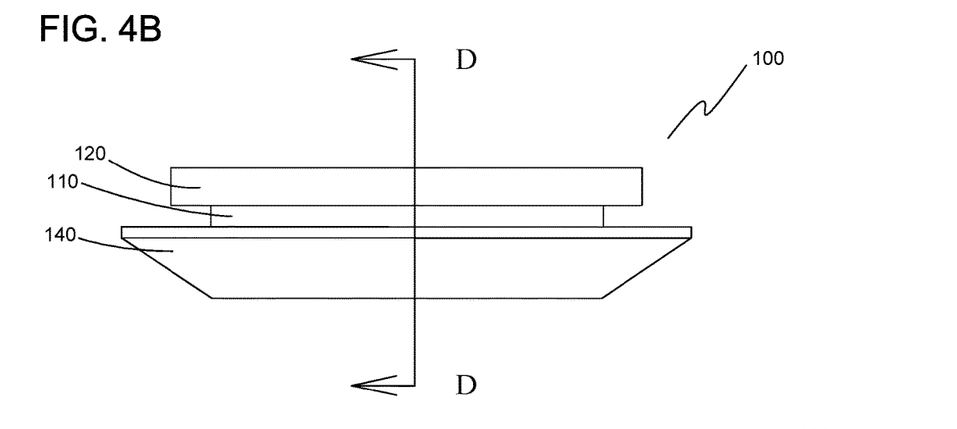
Figure 4C:
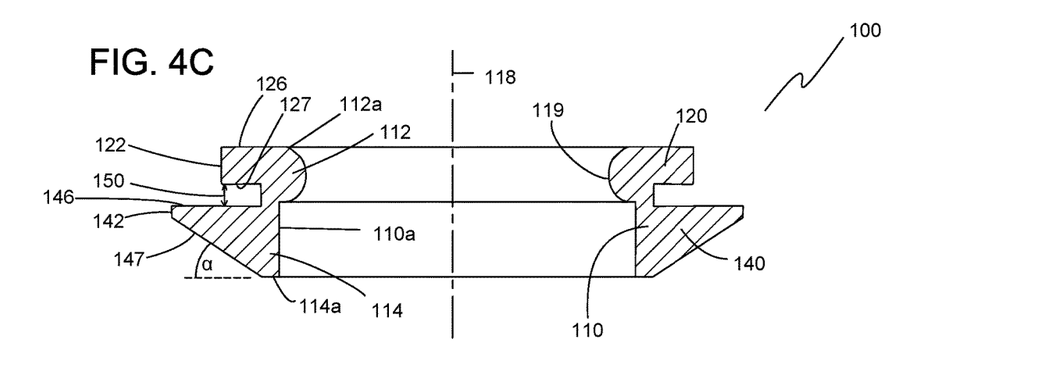

Referring now to FIGS. 4A-4C, another embodiment of collar 100 is shown in a perspective view, a front elevational view, and a sectional view as taken along line D-D of FIG. 4B, respectively. In this embodiment of collar 100, each of the first flange top surface 126, first flange bottom surface 127, and second flange top surface 146 extend radially outward from body portion 110 in a direction substantially perpendicular to central axis 118. Second flange bottom surface 147 is inclined at angle α with respect to central axis 118. Accordingly, first flange 127 has a rectangular profile as shown in FIGS. 4B-4C. Second flange top surface 146 is perpendicular to central axis 118 and second flange bottom surface 147 defines an angle α of 30-35° with the horizontal. Top face 146 and bottom face 147 of second flange 140 extend to second outer flange end 142, which is parallel with central axis 118. Accordingly, second flange has a wedge-shape profile as shown in FIGS. 4B-4C. Bottom face 147 is sloped for convenience to avoid interference with a lower panel or receiver (not shown), but may be either sloped or extend perpendicular to central axis 118 as does top face 146. As such, collar 100 as shown in FIGS. 4A-4C is configured to be used, for example, with a fastener having a domed or button-cap head 202.

In the embodiment shown in FIGS. 4A-4C, annular protrusion 119 begins at first body end 112a and has a rounded or semicircular profile. Annular protrusion 119 extends axially downward along inside surface 110a approximately to second flange top surface 146.

Figure 5A:
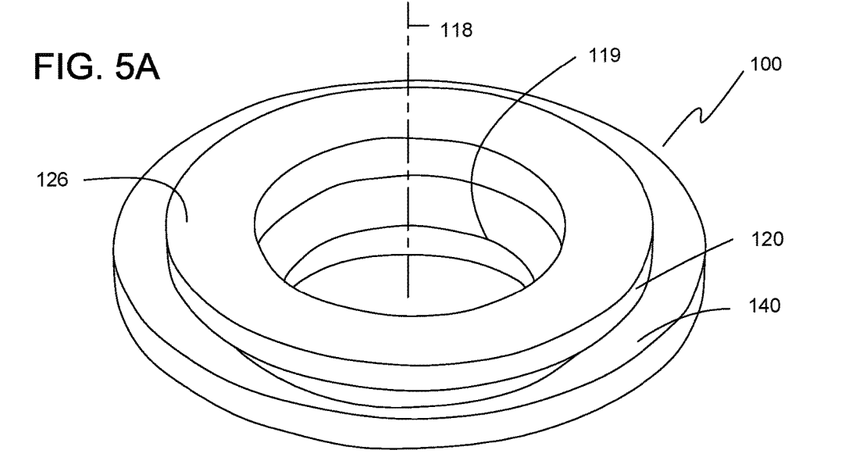
FIGS. 5A-5C illustrate perspective, elevational, and sectional views, respectively, of another embodiment of an elastomeric collar of the present invention configured for a recessed opening and a domed-top fastener.
Figure 5B:
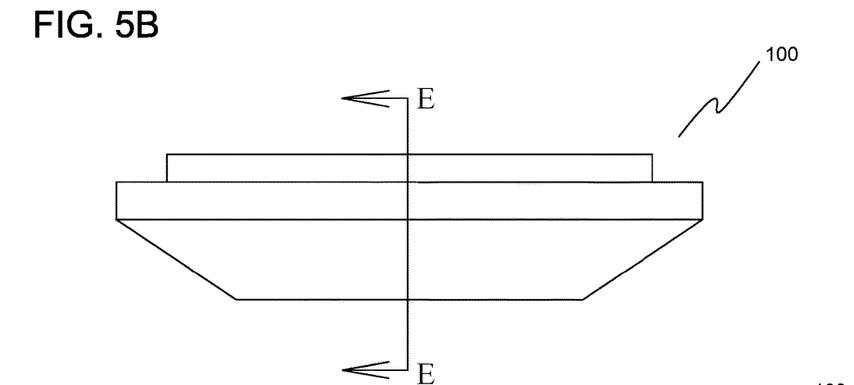
Figure 5C:
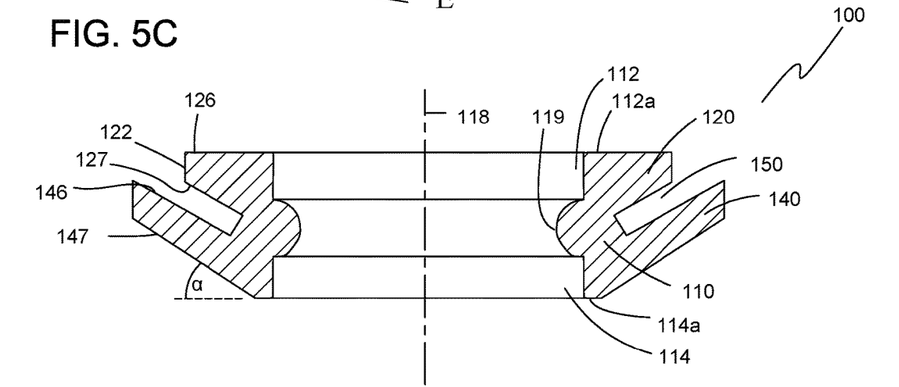

Referring now to FIGS. 5A-5C, another embodiment of collar 100 is shown in a perspective view, a front elevational view, and a sectional view as taken along line E-E of FIG. 5B, respectively. In this embodiment of collar 100, first flange top surface 126 extends substantially perpendicular to central axis 118. First flange bottom surface 127 extends at an angle α of about 50-55° to central axis 118 (30-35° to the horizontal). First flange top surface 126 and first flange bottom surface 127 extend to first outer flange end 122 which is parallel with central axis 118. Accordingly, first flange 127 generally has a wedge-shape profile as shown in FIGS. 5B-5C. Similar to the embodiment of FIGS. 1A-1C, second flange top surface 146 and second flange bottom surface 147 140 extend in parallel from body portion 110 an angle α of 30-35° with the horizontal, preferably 33°.

Second flange top surface is substantially parallel with first flange bottom surface 127 and extend to second outer flange end 142, which is parallel with central axis 118. The inclined second flange bottom surface 127, second flange top surface 146, and first flange bottom surface 127 all define substantially the same angle α. As such, collar 100 of FIGS. 5A-5C is particularly suited for use with countersunk fastener openings and roundhead fasteners. First flange top surface 126 is suited for turnlock fasteners 200 having a flat bottom surface as found on a roundhead fastener. Annular protrusion 119 is approximately centered between first body end 112a (top) and second body end 114a (bottom.)

FIG. 6 illustrates a cross-sectional view of one embodiment of collar 100, fastener 200, and panel 260. Panel 260 is an outer panel and has a panel body 261 with a fastener opening 262 and a countersunk region 264 surrounding fastener opening 262. As shown in FIG. 6, countersunk region 264 slopes downward to fastener opening 262 from the horizontal panel body 261. Fastener 200 is a flathead turnlock fastener with a screw head 202, a narrowed neck 210, and a shaft 220, where neck 210 is between head 202 and shaft 220 and occupies fastener opening 262 when installed.

Collar 100 is similar to the embodiment of FIGS. 1A-1C. One difference, however, is that second flange top surface 146 and second flange bottom surface 147 converge radially to a narrow rim 149 or point 149 rather than extending in parallel to second outer flange end 142. This reduced profile compared to second flange end 142 in FIG. 1C further avoids interference with a lower panel (not shown), which would be positioned below second flange bottom surface 147. First flange top surface 126 of first flange 120 extends along bottom screw head surface 203 of fastener head 202 with first upper rim 124 fitting into a nook 205 defined by lower screw head protrusion 204. First flange 120 and second flange 140 extend from body portion 110 at angle α matching that of countersunk region 264 and bottom screwhead surface 203, which commonly is about 33°. Panel 260 at fastener opening 262 is received in gap 150. Annular protrusion 119 is rounded, sized, and positioned to mate with narrowed neck 210 of fastener 200 with first flange top surface 126 abutting the bottom screwhead surface 203 of the fastener head 202. Inside surface 110a of body portion 110 below annular protrusion 119 has a diameter consistent with that of shaft 220.

In use, collar 100 is preferably installed first in the fastener opening 262 with the panel 260 positioned between first flange 120 and second flange 140. After installing collar 100 in the fastener opening 262, the fastener 200 is then installed through central opening 110 and fastener opening 262. Fastener 200 may be a turnlock fastener or other fastener 200 including a screw, a bolt, a rivet, or other standard or custom fastener. As fastener 200 is tightened, first flange 120 of collar 100 is pressed between fastener head 202 and panel 260 to form a water-tight seal. Therefore, water, fuel, and other liquids do not pass through fastener opening 262 in panel 260. Collar 100 also prevents or greatly reduces wear on panel 260 due to dampening vibration of fastener 200 and panel 260 when installed in fastener opening 262. Being made of an elastomeric material such as polyurethane, collar 100 is very durable and resilient. Collar 100 also has a long service life and withstands UV light and exposure to fuel, oil, water, heat, cold, and other environments without appreciable degradation.

In one example, fastener 200 is a turnlock fastener or rivet that holds a carbon fiber panel to a rigid frame of a race car. Collar 100 installed in the fastener opening 262 as described above greatly reduces wear on the panel that otherwise would occur due to contact with and vibration of fastener 200.

Embodiments of collar 100 discussed above are configured for turnlock fasteners. However, collar 100 of the present invention may be modified for use with rivets, screws, bolts, or other permanent or non-permanent fasteners by adjusting the size, angles, and shape. Similarly, while embodiments of collar 100 are shown and described as having a round shape as viewed from above, other embodiments of first and/or second flange 120, 140 may be oblong, square, rectangular, or other shape. Embodiments of collar 100 can be made according to standard sizes for any fastener 200 and corresponding fastener opening 262 and alternately may be made in custom sizes and shapes or made oversized to cover a worn or damaged fastener opening 262.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

I claim:

1. An elastomeric vibration isolator for use with turn-lock fasteners, the vibration isolator comprising:
    a body portion generally having a hollow cylindrical shape extending along a central axis and defining a through-opening along the central axis, the body portion having an upper body end portion, a lower body end portion, an inside body surface, and an outside body surface;
    a first annular flange continuous with and extending radially outward from the upper body end portion, the first annular flange having a first flange top surface and a first flange bottom surface; and
    a second annular flange continuous with and extending radially outward from the lower body end portion, the second annular flange having a second flange top surface and a second flange bottom surface, wherein the second annular flange is axially spaced by a gap from the first annular flange, wherein the first flange bottom surface and the second flange upper surface each extend from the body portion in parallel at an angle of 45-70° with respect to the central axis;
    wherein the body portion, the first annular flange, the second annular flange comprise a single monolithic structure made of an elastomer having a durometer of at least 40A; and
    wherein the vibration isolator is sized and constructed for installation in an opening defined in a panel with a turn-lock fastener extending through the through-opening of the vibration isolator.

2. The vibration isolator of claim 1, wherein the elastomer has a durometer of at least 60A.

3. The vibration isolator of claim 1, wherein the elastomer has a durometer of at least 95A.

4. The vibration isolator of claim 3, wherein the elastomer is selected from the group consisting of polyurethane, butadiene, and nylon.

5. The vibration isolator of claim 1 further comprising:
    an annular protrusion extending radially inward from the inside body surface.

6. The vibration isolator of claim 5, wherein the annular protrusion has a rounded profile.

7. The vibration isolator of claim 5, wherein the annular protrusion is located on the upper end portion.

8. The vibration isolator of claim 1, wherein the first flange bottom surface and the second flange top surface each extend from the body portion in parallel at an angle of 55-60° with respect to the central axis.

9. The vibration isolator of claim 8 wherein the first annular flange is at least partially nested within the second annular flange.

10. The vibration isolator of claim 1 wherein the gap is from about 0.2 to about 0.6 inch.

11. The vibration isolator of claim 1, wherein at least one of the first flange top surface and the second flange bottom surface is perpendicular to the central axis.

12. The vibration isolator of claim 1, wherein at least one of the first flange top surface and the second flange bottom surface is substantially parallel to the second flange top surface.

13. The vibration isolator of claim 12, wherein the second flange bottom surface is parallel to the second flange top surface.

14. The vibration isolator of claim 1, wherein at least three of the first flange top surface, the first flange bottom surface, the second flange top surface, and the second flange bottom surface are inclined with respect to the central axis.

15. The vibration isolator of claim 14, wherein at least three of the first flange top surface, the first flange bottom surface, the second flange top surface, and the second flange bottom surface extend from the body portion in parallel.

16. A vibration isolator for use with a turn-lock fastener, the vibration isolator comprising:
   a body portion generally having a hollow cylindrical shape extending along a central axis and defining a through-opening along the central axis, the body portion having an upper body end portion with an upper body end, a lower body end portion with a lower body end, an inside body surface, and an outside body surface;
   an annular protrusion with a rounded profile extending radially inward from the inside body surface of the upper body end portion;
   a first annular flange continuous with and extending radially outward from the upper body end portion, the first annular flange having a first flange top surface and a first flange bottom surface; and
   a second annular flange continuous with and extending radially outward from the lower body end portion, the second annular flange having a second flange top surface and a second flange bottom surface, wherein the second annular flange is axially spaced by a gap from the first annular flange;
   wherein the body portion, the first annular flange, the second annular flange comprise a single monolithic structure made of an elastomer having a Shore-A hardness of at least 60;
   wherein the first flange bottom surface and the second flange top surface extend in parallel from the body portion at an angle from 50 to 70° with respect to the central axis; and
   wherein the vibration isolator is constructed for installation in an opening defined in a panel with a turn-lock fastener extending through the through-opening of the vibration isolator.

17. The vibration isolator of claim 16, wherein the first flange top surface and the first flange bottom surface extend in parallel from the body portion at an angle of 55-60° with respect to the central axis.

18. The vibration isolator of claim 17, wherein the second flange bottom surface extends in parallel with the second flange top surface.

19. The vibration isolator of claim 16, wherein the first flange top surface is perpendicular to the central axis.

20. The vibration isolator of claim 16, wherein the elastomer is polyurethane having a Shore-A hardness of at least 95.

* * * * *